Oct. 13, 1942.  D. E. LEWELLEN ET AL  2,298,395
VARIABLE SPEED TRANSMISSION
Filed Dec. 3, 1940  2 Sheets-Sheet 1

Inventors
DARCY E. LEWELLEN,
EMMONS F. LEWELLEN
BY
Attorneys

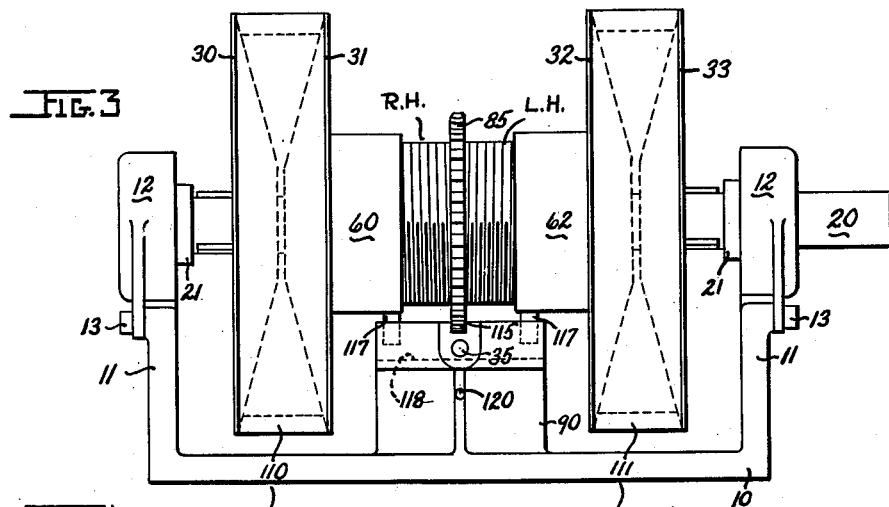
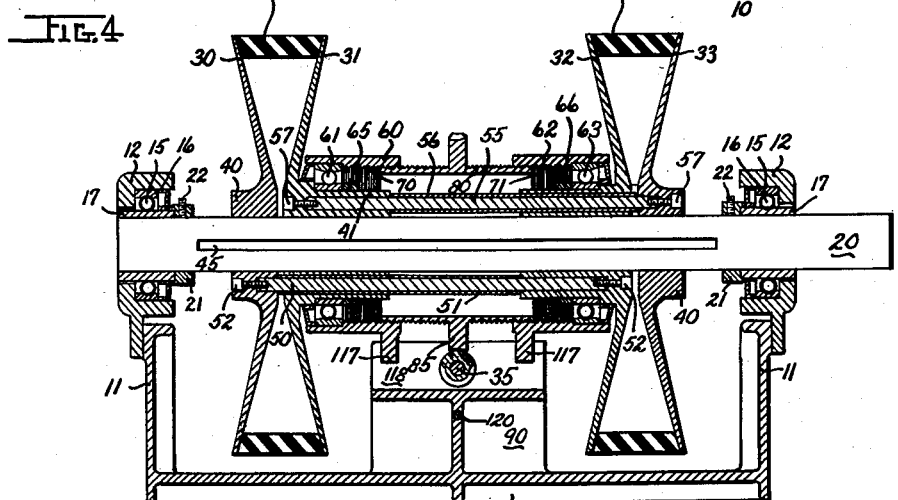
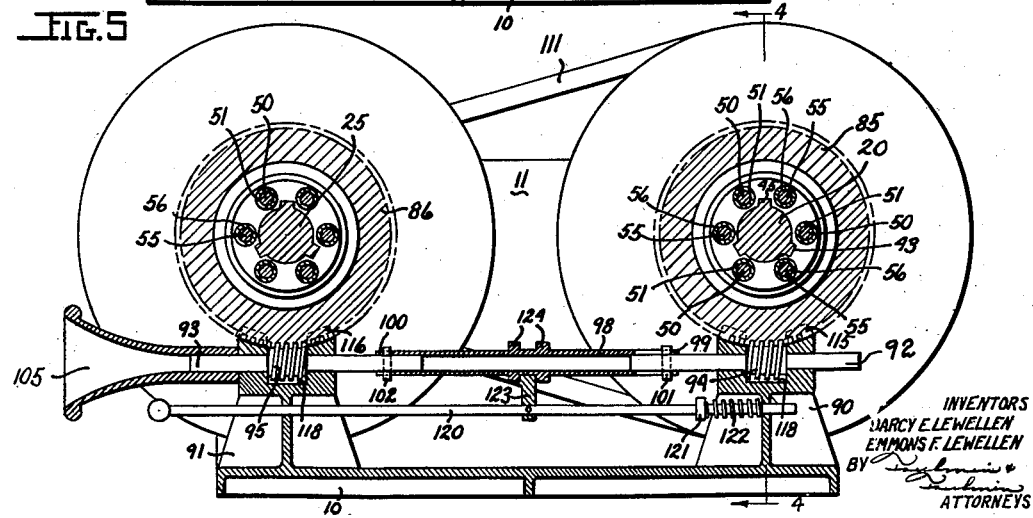

Patented Oct. 13, 1942

2,298,395

UNITED STATES PATENT OFFICE 2,298,395

VARIABLE SPEED TRANSMISSION

Darcy E. Lewellen and Emmons F. Lewellen, Columbus, Ind.

Application December 3, 1940, Serial No. 368,348

10 Claims. (Cl. 74—230.17)

This invention relates to variable speed transmission devices for transmitting power from a constant speed power apparatus to a working mechanism which is to be operated at a plurality of speeds different from that of the power means.

An object of the invention is to provide a variable speed transmission wherein the position of the belt interconnecting variable diameter pulleys is not altered axially with respect the shafts upon which pulleys are mounted.

Another object of the invention is to provide a variable speed transmission device having a plurality of variable diameter pulleys, cooperating pairs of which are interconnected by means of belts, and wherein the axial position of the belts is retained when the pulley diameters are varied.

It is another object of the invention to provide a variable speed transmission having variable diameter pulleys mounted on fixedly spaced parallel shafts, and having means for adjusting the tension of the belts interconnecting the pulleys.

It is another object of the invention to provide a variable speed transmission wherein variable diameter pulleys are mounted on shafts arranged on fixed centers, and wherein the tension of the belt extending between the pulleys can be controlled by varying the diameter of at least one of the pulleys.

Another object of the invention is to provide a variable speed transmission wherein a plurality of disks is positioned on parallel shafts having fixed centers, wherein cooperating disks are adapted to be moved in opposite directions for controlling the effective pulley diameter provided by the disks and for maintaining the predetermined positioning of the belt interconnecting cooperating sheaves formed by the disks.

It is a still further object of the invention to provide means for controlling the belt tension of a variable speed transmission by altering the effective diameter of the sheaves.

It is another object of the invention to provide a variable speed transmission wherein a plurality of belts are used and can be maintained in a predetermined spaced relation and in a fixed lateral position with respect the shafts which carry the sheaves of the variable speed transmission.

It is another object of the invention to provide a mechanism for moving the disks of a sheave for a variable speed transmission in opposite directions simultaneously to alter the effective diameter thereof.

A still further object of the invention is to provide a variable speed transmission having a mechanism for altering the effective diameter of the disks forming the sheaves thereof, which mechanism is also effective to alter the diameter of the sheaves independently to provide belt tensioning apparatus.

Another object of the invention is to provide a variable speed transmission having a plurality of sheaves interconnected with a plurality of belts wherein corresponding disks of the cooperating halves of the sheaves are moved in opposite directions simultaneously to alter the effective pulley diameter of the sheaves.

Further objects and advantages will become apparent from the drawings and the following description.

In the drawings:

Figure 3 is an end elevational view of the apparatus.

Figure 4 is a vertical cross-sectional view taken along line 4—4 of Figure 5.

Figure 5 is a vertical cross-sectional view taken along line 5—5 of Figure 1.

Figure 1:
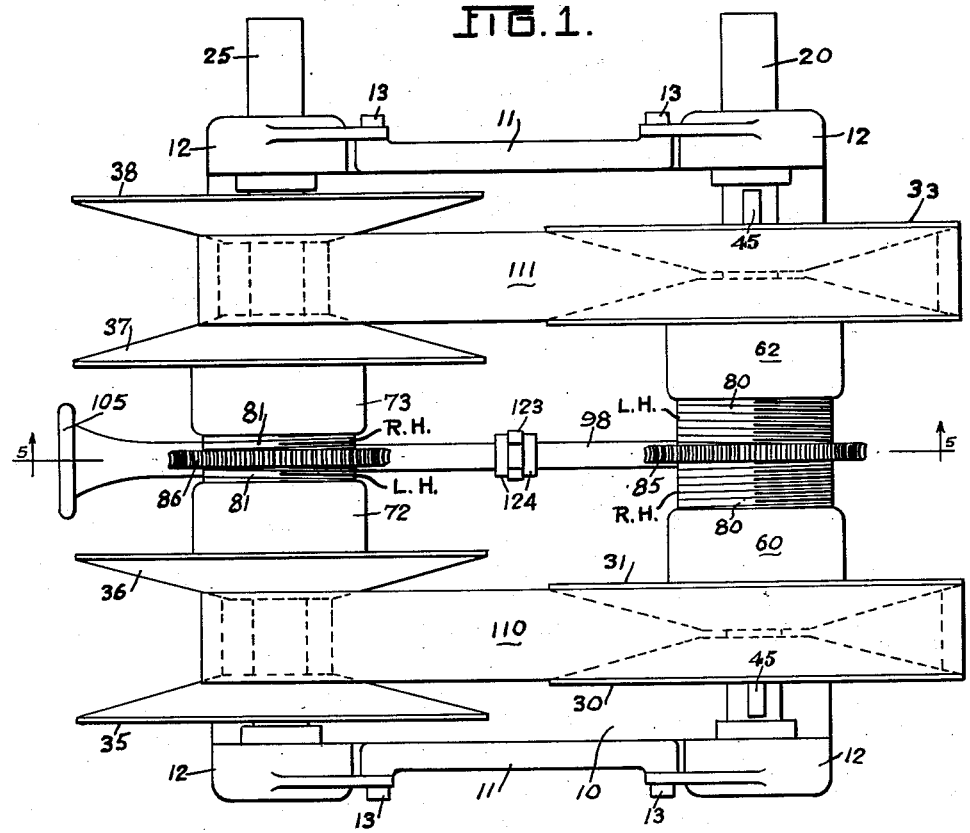
Figure 1 is a plan elevational view of the variable speed transmission of this invention.
Figure 2:
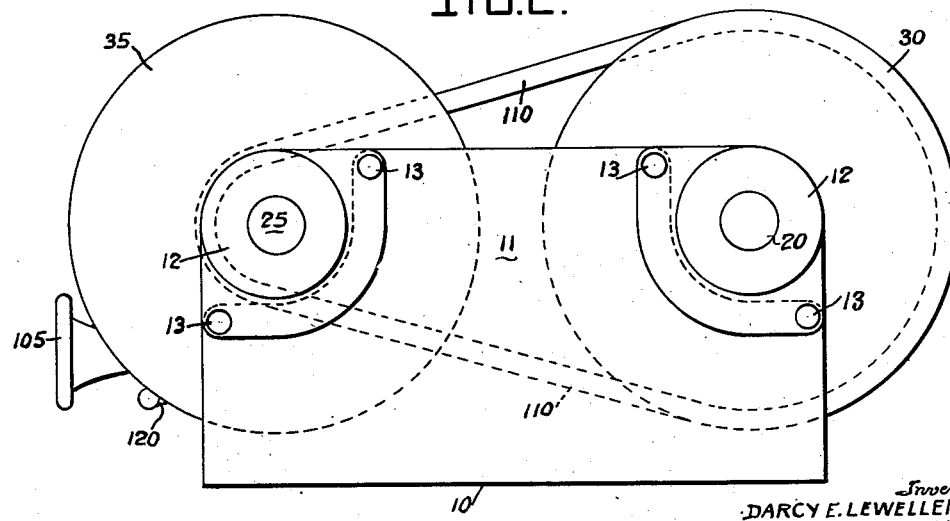
Figure 2 is a side elevational view of the apparatus.

In this invention the variable speed transmission consists of a base 10 having side walls 11 which extend vertically from the base 10 and upon which the bearing housings 12 are positioned. These bearing housings 12 are secured to the side walls 11 by means of bolts 13. The bearing housings 12 enclose a friction-free bearing member 15, the outer race 16 of which is secured to the housing 12. The inner race 17 of the bearing 15 supports a shaft 20 which is suitably journaled therein. A collar 21 fixedly secures the inner race 17 to the shaft 20, and is in turn secured to the shaft 20 by means of a set screw 22.

Each of the bearing housings 12 is provided with a bearing support member, as herein described, for supporting the shafts 20 and 25. The shafts 20 and 25 are thus arranged in substantial parallelism and the axes thereof are fixed with respect to each other.

A plurality of disks 30, 31, 32 and 33 is positioned upon the shaft 20 while a plurality of disks 35, 36, 37 and 38 is positioned upon the shaft 25. The disks 30, 33, 35 and 38 are provided with bearing bushings 40 which are journaled upon the shafts 20 and 25 for supporting the respective disks thereon while the disks 31, 32, 36 and 37 are provided with bearing bushings 41 for their respective support upon the shafts 20 and 25. The shafts 20 and 25 are provided with keys 45 which extend longitudinally along the shaft, the bushings 40 and 41 having slots 43 cut therein to permit the bushings to slide along the shafts 20 and 25 and preventing rotation thereof with respect the shafts.

A rod 50 extends between the disks 30 and 32. A spacing tube 51 surrounds the rod 50 for positioning the disks 30 and 32 with respect each other. The rod 50 is securely fastened to the disks 30 and 32 by means of the bolts 52.

A similar interconnecting means is provided for the disks 31 and 33 consisting of the rod 55 and the spacing tube 56, the rod 55 being secured to the disks 31 and 33 by means of the bolts 57. The rods 50 and 55 thereby provide means to move the disks attached thereto simultaneously so that belt members which are carried between the disks can maintain proper engagement with the faces thereof when the effective diameter between the disks forming the sheaves for the belts is varied.

The disks 35 and 37 are connected in the same manner as the disks 30 and 32, while the disks 36 and 38 are connected in the manner of the disks 31 and 33. Sufficient clearance is provided around the spacing tubes 51 in the bushing 41 to permit the disk 31 to slide thereupon, a similar amount of clearance being provided for the spacing tube 56 in the bushing 41 of the disk 32.

It is thus seen that the disks forming the sheaves for the variable speed transmission are movable laterally with respect the shafts 20 and 25 so that the effective diameters thereof can be altered. The mechanism for laterally moving the disks of the sheaves consists of a sleeve 60 carried upon a bearing 61 which is mounted upon the bearing of the disk 31. A sleeve 62 is carried upon a bearing 63 mounted upon the bushing 41 of the disk 32. The friction-free bearings 61 and 63 are secured upon the respective bushings 41 by means of retaining rings 65 and 66. The sleeves 60 and 62 are securely fastened to the bearing members 61 and 63 so that lateral movement imposed upon the sleeves 60 and 62 will be transferred through the bearings 61 and 63 to the disks 31 and 32 respectively.

The sleeves 60 and 62 are threaded internally as at 70 and 71, the thread indicated at 70 being a right-hand thread while the thread indicated at 71 is a left-hand thread.

The disks 36 and 37 are similarly provided with sleeves 72 and 73 respectively which are mounted in a manner like that of the sleeves 60 and 62, and are provided with internal threads in the same manner as these sleeves. However, the sleeve 72 is provided with a left-hand thread while the sleeve 73 is provided with a right-hand thread.

An externally threaded sleeve 80 having right and left hand threads thereon cooperates with the left and right hand threads of the sleeves 60 and 62 whereby the sleeves 62 and 60 are interconnected by a common member. A similar externally threaded sleeve 81 is provided within the sleeves 72 and 73 and is properly threaded to cooperate with the left and right hand threads respectively of the sleeves 72 and 73.

A worm wheel 85 is positioned upon the sleeve 80 while a worm wheel 86 is positioned upon the sleeve 81. These wheels may be separable members or can be formed as integral parts of the sleeves 80 and 81 respectively.

The base 10 is provided with upwardly extending support members 90 and 91 in which there are journaled shafts 92 and 93 which carry worms 94 and 95 respectively. These worms 94 and 95 engage the worm wheels 85 and 86 for rotating the same, and are arranged so that both wheels 85 and 86 rotate in the same direction.

The shafts 92 and 93 are interconnected by means of a tube 98 which extends around the ends of the shafts 92 and 93 and which is provided with slots 99 and 100 in the ends thereof. The shaft 92 is provided with a pin 101 extending therethrough and in engagement with the slot 99, while the shaft 93 has a pin 102 extending therethrough in engagement with the slot 100. A hand wheel 105 is secured to the shaft 93 for rotating the same and through means of the tube 98 for rotating a shaft 92.

From the foregoing description it may now be readily seen that when the worms 94 and 95 are rotated by means of the hand wheel 105 that the worm wheels 85 and 86 will be rotated in a manner to cause rotation of the sleeves 80 and 81 respectively. Since the sleeves 80 and 81 have left and right hand threads, as heretofore designated, which cooperated with the left and right hand threads of the sleeves 60, 62, 72 and 73 respectively it can be seen that rotation of the sleeves 80 and 81 respectively in one direction will cause the sleeves 60 and 62 to be moved inwardly while the sleeves 72 and 73 are moved in an outward direction, the left and right hand threads of the various elements cooperating to produce these movements.

When the sleeve 60 is moved inwardly, the disks 31 and 33 will be moved in a right hand direction, the movement of the sleeve 62 in an inward direction causing the disks 30 and 32 to be moved in a leftward direction, the movements of the respective disk members being simultaneously occasioned.

Since, as heretofore related, the left and right hand threads of the sleeve 81 are obverse to the left and right hand threads of the sleeve 80, it can be seen that the movement of the sleeves 72 and 73 and the disks carried thereby will be obverse to the movement of the sleeves 60 and 62 and the disks carried thereby. Thus, when the worm wheels 85 and 86 are rotated in one direction the effective diameters of the sheaves formed by the disks 30, 31 and 32, 33 will be lessened, while the effective diameters of the sheaves formed by the disks 35, 36 and 37, 38 will be increased, thus causing the shafts 20 and 25 to rotate at a different speed ratio.

The manner in which the disks 30, 31, 32, 33, 35, 36, 37, 38 are moved when varying the effective diameters of the sheaves formed thereby results in the re-tension of the axial positioning of the belts 110 and 111. By this arrangement, it is possible to pre-position the spaced relationship of the belts 110 and 111 with respect their axial position upon the shafts 20 and 25 and maintain that axial position regardless of the change in the effective diameters of the sheaves of the variable speed transmission, whereby lateral movement of the belts is prevented which, under many working conditions, is a decided disadvantage where space requirements are at a minimum.

To prevent the worm wheels 85 and 86 from shifting laterally upon the shafts 20 and 25 respectively, the support members 90 and 91 are provided with slots 115 and 116 respectively in which the worm wheels 85 and 86 respectively are positioned. To retain the sleeves 61, 62, 72 and 73 from rotation, these sleeves are provided with extending tongues 117 which depend into a slot 118 provided in the support members 90 and 91. The tongues 117 permit the sleeves 61, 62, 72 and 73 free lateral movement with respect the shafts 20 and 25 but prevents the rotational movement thereof.

The description heretofore presented has referred to the construction of the device for obtaining opposing directional movements of co-operating disk members forming a sheave for a variable speed transmission, and the manner of interconnecting a plurality of such cooperating disks to provide simultaneous opposite directional movements of the cooperating disk members. However, the mechanism for varying the effective diameters of the sheaves also provides means for controlling tension upon the belts of the variable speed transmission. After normal use and wear the belts extending between pulleys having fixed centers will become loose and some means must be provided for altering either the center spacing of the pulleys or the effective diameters thereof in order to re-tension the belt.

In this invention there is provided means for disconnecting operation of the sheaves upon the shaft 25 from the operation of the sheaves upon the shaft 20 so that the sheaves upon the shaft 25 can be altered in effective diameters to thereby re-tension the belt interconnecting the co-operating sheaves on the shafts 20 and 25 respectively.

The mechanism for disconnecting the shafts, as heretofore mentioned, consists of a rod 120 which is journaled in the bearing supports 90 and 91. A collar 121 is fixedly mounted upon the rod 120 and a spring 122 is positioned between the collar 121 and the support 90 whereby the rod 120 is constantly urged in the leftward direction. A fork 123 is fixedly mounted upon the rod 120 by suitable means and engages a pair of collars 124 secured to the tube 98.

Since the spring 122 urges the rod 120 in the leftward direction, the yoke 123 will urge the tube 98 in the leftward direction since the yoke 123 is carried between the collars 124, whereby the tube 98 moves in a leftward direction until the end of the slot 100 engages the pin 102. This is the normal operating condition of the apparatus. However, when it is desired to re-tension the belt operating between cooperating sheaves the rod 120 is moved in a rightward direction whereby the slot 99 permits the tube 98 to move in a rightward direction sufficiently far to disengage the pin 102 from the slot 100. When the apparatus is in this position the hand wheel 105 can be rotated to thereby rotate the worm wheel 86 independently of the worm wheel 85 so that the effective diameter of the sheaves carried upon the shaft 25 will be altered to an extent to re-establish the proper tension upon the belts 110 and 111.

While the form herein disclosed is a preferred form, yet the various elements may take different structural form and the specific manner of operating the motion of the various disks can be altered to accomplish the same result. It is therefore to be understood that there is included in the scope of this invention such alterations and modifications as fall within the scope of the claims.

Having thus fully described our invention, what we claim as new and desire to secure by Letters Patent is:

1. Variable speed transmission comprising a pair of shafts arranged on fixed axial centers, each of said shafts having a plurality of pairs of disks arranged for axial movement thereon forming variable diameter pulleys, means rigidly interconnecting like disks of adjacent pulleys, threaded means carried by the inside disks of adjacent pulleys, and threaded means having threads of opposite hand interconnecting said threaded means of said inside disks, said last mentioned threaded means causing movement of cooperating disks in opposite directions.

2. Variable speed transmission comprising a pair of shafts arranged on fixed axial centers, each of said shafts having a plurality of pairs of disks arranged for axial movement thereon forming variable diameter pulleys, means rigidly interconnecting like disks of adjacent pulleys, threaded means carried by the inside disks of adjacent pulleys, threaded means having threads of opposite hand interconnecting said threaded means of said inside disks, and a common rotatable control shaft interconnecting the last mentioned threaded means of each of the pulley assemblies for concomitantly moving cooperating pulley disks in opposite directions and obverse disks of cooperating pulleys upon adjacent shafts in the same direction.

3. A pulley assembly comprising a shaft, a plurality of pairs of disks arranged for axial movement on said shaft, rigid means extending from adjacent inside disks for connecting to the outside disks of the opposite pair of disks, threaded means carried by the inside disks coaxial with said shaft and having threads of the opposite hand, and a threaded member positioned coaxial with said shaft for interconnecting said last mentioned threaded means and having threads thereon to match the threads of opposite hand of said first mentioned threaded means, said last mentioned member being rotatable with respect to the first mentioned threaded means for causing opposite movement of cooperating pulley disks.

4. A pulley assembly comprising a shaft, a plurality of pairs of disks arranged for axial movement upon said shaft, rigid means interconnecting adjacent inside disks with opposite outside disks, a threaded cylinder carried by each of said inside disks upon a substantially friction free bearing to permit rotation of said disks with respect to said cylinder, said cylinders being coaxial with said shaft and having threads of opposite hand, a threaded cylinder interconnecting said first mentioned cylinders and having threads to match the threads of said first mentioned cylinders, and means to rotate said second mentioned cylinders to cause movement of said pulley disks in opposite directions.

5. A variable speed transmission comprising a pair of cooperating pulley assemblies interconnected by belt means, each of said assemblies consisting of a shaft, a plurality of pairs of disks arranged for axial movement upon said shaft, rigid means interconnecting adjacent inside disks with opposite outside disks, a threaded cylinder carried by each of said inside disks upon a substantially friction free bearing to permit rotation of said disk with respect to said cylinder, said cylinders being coaxial with said shaft and having threads of opposite hand, a threaded cylinder interconnecting said first mentioned cylinders and having threads to match the threads of said first mentioned cylinders, and a common shaft means for rotating said second mentioned cylinders to cause movement of said pulley disks in opposite directions.

6. A variable speed transmission comprising a pair of cooperating pulley assemblies interconnected by belt means, each of said assemblies consisting of a shaft, a plurality of pairs of disks arranged for axial movement upon said shaft, rigid means interconnecting adjacent inside disks with opposite outside disks, a threaded cylinder carried by each of said inside disks upon a substantially friction free bearing to permit rotation of said disk with respect to said cylinder, said cylinders being coaxial with said shaft and having threads of opposite hand, a threaded cylinder interconnecting said first mentioned cylinders and having threads to match the threads of said first mentioned cylinders, and a common shaft means for rotating said second mentioned cylinders to cause movement of said pulley disks in opposite directions, said shaft means having means to break the driving connection between the second mentioned cylinders to permit one of said second mentioned cylinders to be rotated independently of the other and thereby tension the belts extending between the pulley assemblies.

7. A variable speed transmission comprising a pair of cooperating pulley assemblies interconnected by belt means, each of said assemblies consisting of a shaft, a plurality of pairs of disks arranged for axial movement upon said shaft, rigid means interconnecting adjacent inside disks with opposite outside disks, a threaded cylinder carried by each of said inside disks upon a substantially friction free bearing to permit rotation of said disk with respect to said cylinder, said cylinders being coaxial with said shaft and having threads of opposite hand, a threaded cylinder interconnecting said first mentioned cylinders and having threads to match the threads of said first mentioned cylinders, and a common shaft means for rotating said second mentioned cylinder to cause movement of said pulley disks in opposite directions, said shaft means comprising a shaft in cooperating engagement with each of said second mentioned cylinder means, a second shaft telescoping over said first mentioned shafts, means for drivingly connecting said telescoping shaft to said first mentioned shafts, and means for moving said telescoping shaft with respect to said first mentioned shafts for breaking the driving connection therebetween.

8. Pulley means for a variable speed transmission comprising a shaft, a plurality of disks slidably mounted upon said shaft for lateral movement thereon and cooperating to form belt pulleys, independent means interconnecting like disks of said pulleys, independent non-rotatable axially movable means associated with each of said independent means and having threads thereon of the opposite hand, rotatable axially stationary means having threads of opposite hand thereon for interconnecting said non-rotatable but axially movable means, and means for rotating said rotatable means for simultaneously moving cooperating pulley disks in opposite directions.

9. A variable speed transmission including a pair of variable diameter pulley assemblies each comprising a shaft, a plurality of disks slidably mounted on said shaft for lateral movement thereon and cooperating to form belt pulleys, independent means rigidly interconnecting like disks of adjacent pulleys, rotatable axially stationary means associated with and disposed between the inside disks of said pulleys and having thread means of opposite hand thereon, independent non-rotatable but axially movable means supported by each of the inside disks of said pulleys, said non-rotatable means having thread means of opposite hand to match the thread means on said rotatable means for connecting said inside pulley disks with said rotatable means, and a single control shaft having means thereon directly engaging said rotatable means of adjacent and cooperating pulley assemblies for simultaneously moving the disks of said pulley assemblies in opposite directions.

10. A variable speed transmission consisting of one relatively constant speed driving shaft and one relatively variable speed driven shaft, a plurality of coacting disks slidably mounted upon said shafts for axial movement thereon and cooperating to form belt pulleys of variable diameters, belt means interconnecting the pulleys on said shafts, a single non-rotatable axially movable means associated with each pair of coacting disks for moving one of the disks with respect to the other and having a threaded surface, rotatable axially stationary means having threaded surfaces of opposite hand engaging the threaded surfaces of adjacent non-rotatable means to interconnect the same, and a common control means engaging each of said rotatable means for moving coacting disks in opposite directions to increase the effective belt diameters of the pulleys on one shaft and decrease the effective diameters of the pulleys on the other shaft and consequently change the relative speeds of the driving and driven shafts.

DARCY E. LEWELLEN.
EMMONS F. LEWELLEN.